United States Patent
Tang et al.

(10) Patent No.: US 9,030,911 B2
(45) Date of Patent: May 12, 2015

(54) METHOD AND SYSTEM FOR DELINEATING A SECOND WELLBORE FROM A FIRST WELLBORE

(75) Inventors: Xiao Ming Tang, Sugar Land, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 1535 days.

(21) Appl. No.: 12/327,286

(22) Filed: Dec. 3, 2008

(65) Prior Publication Data

US 2009/0296522 A1 Dec. 3, 2009

Related U.S. Application Data

(60) Provisional application No. 61/012,219, filed on Dec. 7, 2007.

(51) Int. Cl.
*G01V 1/44* (2006.01)
*E21B 47/00* (2012.01)
*E21B 47/022* (2012.01)

(52) U.S. Cl.
CPC ............ *G01V 1/44* (2013.01); *E21B 47/02208* (2013.01)

(58) Field of Classification Search
USPC ........................ 367/25, 86, 75, 31; 175/40, 45
See application file for complete search history.

(56) References Cited

U.S. PATENT DOCUMENTS

| | | | | |
|---|---|---|---|---|
| 3,853,185 | A | * | 12/1974 | Dahl et al. ................. 340/853.4 |
| 4,391,336 | A | * | 7/1983 | Coon et al. ...................... 175/45 |
| 4,817,061 | A | * | 3/1989 | Alford et al. .................... 367/75 |
| 5,678,643 | A | * | 10/1997 | Robbins et al. ................. 175/45 |
| 6,614,360 | B1 | * | 9/2003 | Leggett et al. .................. 367/35 |
| 7,035,165 | B2 | | 4/2006 | Tang |
| 2008/0151690 | A1 | | 6/2008 | Tang et al. |

FOREIGN PATENT DOCUMENTS

WO 2007087435 8/2007

OTHER PUBLICATIONS

Schoenberg, M. "Fluid and Solid Motion in the Neighborhood of a Fluid-filled Borehole Due to the Passage of a Low-frequency Elastic Plane Wave." Geophysics, v. 51, Issue 6, pp. 1191-1205, 1986.
Peng, C. "Borehole Effects on Downhole Seismic Measurements," Ph.D. Thesis, Massachusetts Institute of Technology, 306 pages, Feb. 1994.

* cited by examiner

*Primary Examiner* — Ian J Lobo
(74) *Attorney, Agent, or Firm* — Cantor Colburn LLP

(57) ABSTRACT

Disclosed herein is a method of delineating a second wellbore from a first wellbore. The method includes, emitting acoustic waves from a tool in the first wellbore, receiving acoustic waves at the tool reflected from the second wellbore, and determining orientation and distance of at least a portion of the second wellbore relative to the tool.

13 Claims, 4 Drawing Sheets

US 9,030,911 B2

METHOD AND SYSTEM FOR DELINEATING A SECOND WELLBORE FROM A FIRST WELLBORE

CROSS REFERENCE TO RELATED APPLICATIONS

This application claims priority to U.S. Provisional Application No. 61/012,219, filed on Dec. 7, 2007, the entire contents of which are incorporated herein by reference.

BACKGROUND OF THE INVENTION

To maximize hydrocarbon production, wellbores are routinely steered to desired targets within a formation while being drilled. Accurately delineating the actual path of an existing wellbore, as well as predicting a trajectory that a wellbore being drilled will take, however, has proven difficult. Sensors in the drill string near the bit are used to send positional data uphole. The accuracy of such sensors, however, is affected by adverse conditions encountered downhole. The hydrocarbon recovery industry, therefore, would be receptive to tools that improve the accuracy of determining the location of existing wellbores and the prediction of a trajectory of wellbores during drilling.

BRIEF DESCRIPTION OF THE INVENTION

Disclosed herein is a method of delineating a second wellbore from a first wellbore. The method includes, emitting acoustic waves from a tool in the first wellbore, receiving acoustic waves at the tool reflected from the second wellbore, and determining orientation and distance of at least a portion of the second wellbore relative to the tool.

Further disclosed herein is a downhole wellbore delineation system. The system includes, at least one acoustic emitter positionable within a first wellbore able to emit acoustic waves into the earth, at least one acoustic receiver receptive of acoustic waves reflected from a second wellbore, and a processor in operable communication with the at least one acoustic emitter and the at least one acoustic receiver. The system is able to determine at least a distance and orientation of at least a portion of the second wellbore relative to the delineation system.

Further disclosed herein is a method of steering a wellbore drilling operation. The method includes, emitting acoustic waves from an existing first wellbore, receiving reflected acoustic waves from a second wellbore being drilled, determining an orientation and distance of the second wellbore from the existing first wellbore, and steering the wellbore drilling operation based upon the determined orientation and distance

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed system and method are presented herein by way of exemplification and not limitation with reference to the Figures.

Figure 1:
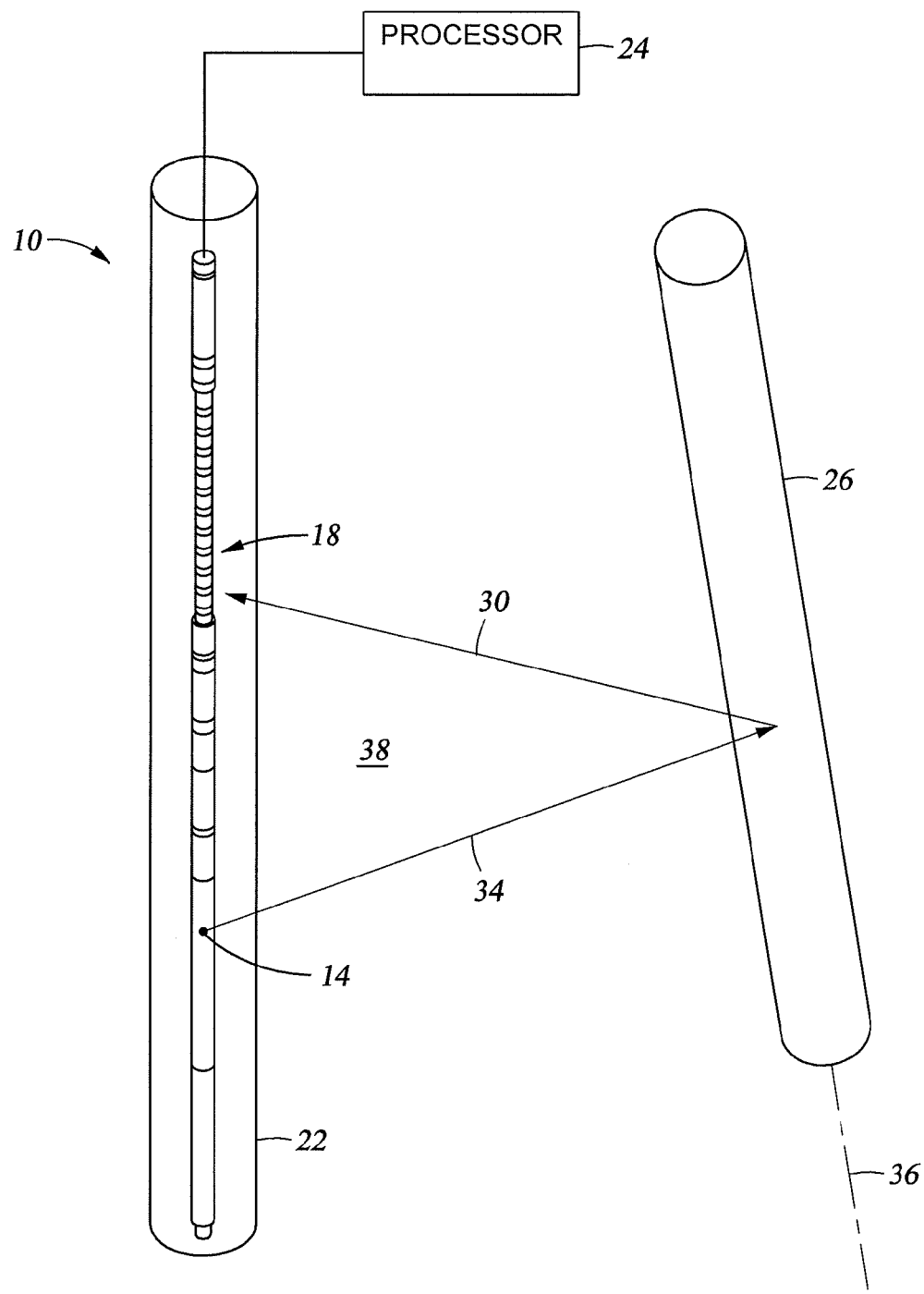
FIG. 1 depicts an embodiment of the wellbore delineation system disclosed herein.

Referring to FIG. 1, an embodiment of the wellbore delineating system 10 is illustrated. The wellbore delineating system 10 includes one or more acoustic emitting device(s) 14 and one or more acoustic receiving device(s) 18, that are positionable downhole within an existing first wellbore 22, and a processor 24. The processor 24 is in operable communication with both the one or more acoustic emitting device(s) 14 and the one or more acoustic receiving device(s) 18 and may be positionable downhole or at surface depending upon the particular application. The wellbore delineating system 10, disclosed herein, is able to determine both the distance from and the orientation, or azimuth, of a second wellbore 26, substantially coplanarly to the first wellbore 22, relative to the wellbore delineating system 10. The one or more acoustic emitting device(s) 14 emit acoustic energy, in the form of waves 34, into the earth that reflect off the second wellbore 26, as reflected waves 30. The reflected waves 30 are received by the one or more acoustic receiving device(s) 18. The processor 24 analyzes the received waves 30 and determines a distance and orientation of the second wellbore 26 relative to the wellbore delineating system 10. The second wellbore 26 can be an existing wellbore or a wellbore being created. How the waves 30, 34 are used to determine a distance and orientation of the second wellbore 26 from the first wellbore 22 will be described with reference to FIGS. 2-4, however, uses for embodiments of the system 10 will be discussed first.

It is often useful to drill the second wellbore 26 nearby the existing first wellbore 22. An example of such an instance is to inject steam down one of the wellbores 22, 26 while producing hydrocarbons from the other of the wellbores 22, 26. In such an instance it can be desirable for the second wellbore 26 to be substantially parallel to the first wellbore 22. By monitoring the distance and azimuth of the second wellbore 26 from the first wellbore 22, embodiments disclosed herein allow well operators to accurately map in three dimensions the portion of the second wellbore 26 that has already been drilled, as well as predict a trajectory 36 defining a path over which the current drilling settings will drill the second wellbore 26. Embodiments disclosed herein, therefore, permit accurate, real-time, feedback of the drilling operation. Such feedback allows the drilling operator to make steering adjustments. Such steering adjustments can be to avoid specific downhole formations, as well as to direct the drilling to a desirable target, for example, to maximize production.

Additionally, the knowledge provided by embodiments disclosed herein allows an operator to direct analysis of the reflected waves 30 to only those from specific orientations, essentially allowing azimuth scanning only in the direction where the second wellbore 26 is know to be, based on previous analysis, or based on knowledge of the physical orientation of the wellbores 22, 26 to one another. Such scanning allows for decreased processing compared to having to process data corresponding to reflected waves 30 received from a full 360 degrees around the first wellbore 22.

Figure 2:
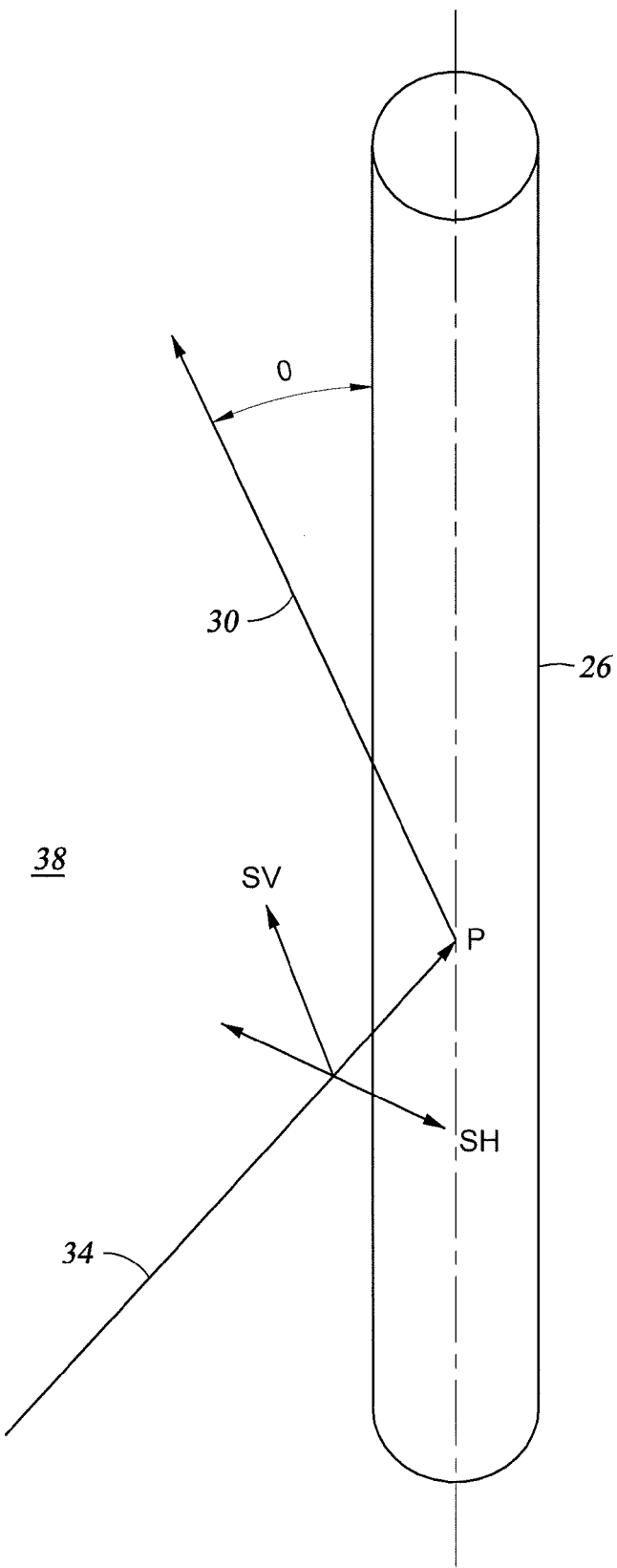
FIG. 2 depicts waves impinging on a wellbore while using the system of FIG. 1.

Referring to FIG. 2, the one or more acoustic emitting device(s) 14 can emit at least three basic elastic waves into a formation 38 surrounding the first wellbore 22. These are; the compressional wave denoted as P, a wave polarized in the plane containing the two wellbores 22, 26 denoted as SV, and a wave polarized normal to the plane containing the two wellbores 22, 26 denoted as SH. Studies have shown that wellbores 22, 26 are strong reflectors to all three elastic waves P, SV and SH as is shown in FIG. 3 below.

Figure 3:
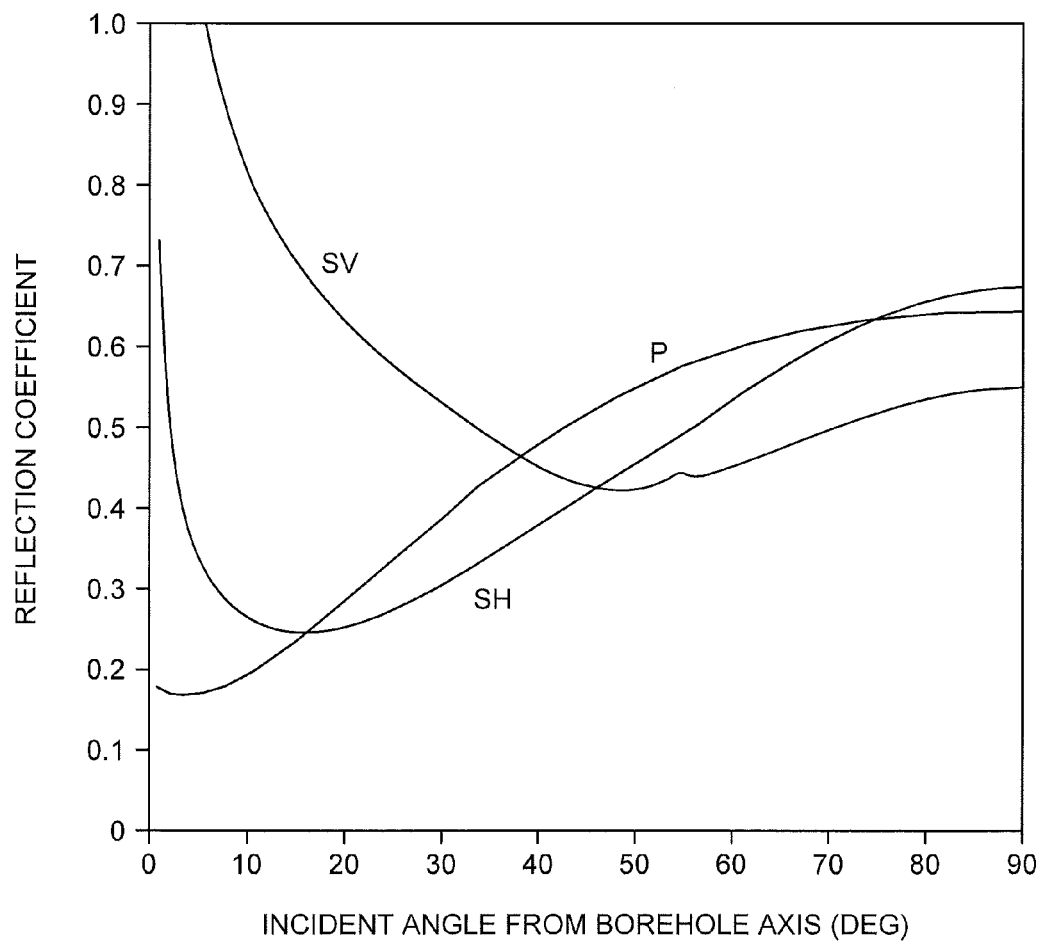
FIG. 3 depicts a graphical representation of a reflection coefficient versus incident angle from a borehole axis.

Referring to FIG. 3, a graph depicting an acoustic reflection coefficient versus incident angel for the P, SV and SH waves 34 impinging on a fluid filled wellbore 26 are illustrated. In this example the modeling is done for an elastic formation (density=2.5; P-wave and S-wave velocities are 4 km/s and 2.3 km/s respectively) surrounding the eight-inch wellbore 26. The borehole reflection modeling can use the theories described in M. Schoenberg, 1986, *Fluid and solid motion in the neighborhood of a fluid-filled borehole due to the passage of a low-frequency elastic plane wave*: Geophysics, v. 51, Issue 6, pp. 1191-1205, and C. Peng, 1993, *Borehole effects on downhole seismic measurements*, Ph.D. Thesis, Massachusetts Institute of Technology, 77 Massachusetts, Cambridge, Mass. 02139, both incorporated herein in their entirety by reference. The incident wave frequency is 2 kHz. The reflection coefficient is defined as the amplitude of the reflected wave relative to that of the incident wave at the incident side of borehole-fluid interface. All three waves show substantial reflection amplitude. At the normal incidence (incident angle=90°, where the two wellbores are parallel to each other), the reflection coefficients exceed 0.5 for this modeled case, giving rise to strong reflection signals that can be measured in the monitoring wellbore 22.

P-Wave Technique

For a P wave reflection, the recorded data along the monitoring wellbore can be processed to extract the reflection wave and subsequently used to provide an image of the nearby wellbore 26 in the formation 38. The data processing and reflection imaging method is described in International Application Publication WO2007/087435 A2, which is incorporated herein in its entirety by reference.

Shear Wave (SH and SV waves) Techniques

The one or more acoustic receiving device(s) 18 can be a multiple-component device capable of sensing the directional variation of the reflection waves 30, particularly the SH and SV shear waves. Correspondingly, the one or more acoustic emitting device(s) 14 is a directional source with a selective firing orientation. Such a directional acoustic system has been described in the U.S. Pat. No. 7,035,165 B2, issued to current co-inventor Tang and incorporated herein in its entirety by reference. In a typical acquisition of the system, a four-component data set (xx, xy, yy, yx) is recorded, where the first letter refers to the source orientation, while the second letter refers to the receiving orientation.

From the four component data, SV and SH reflection waves can be obtained as is described in U.S. Provisional Patent Application 60/871,895, to co-inventors Tang and Patterson, that is incorporated herein in its entirety by reference.

$$SV = xx \cos^2\phi + (xy+yx)\sin\phi \cos\phi + yy \sin^2\phi \quad (1)$$

$$SH = xx \sin^2\phi - (xy+yx)\sin\phi \cos\phi + yy \cos^2 \quad (2)$$

where $\phi$ is the azimuth of the x-axis relative to a reference, e.g., the reflector. That is, in addition to providing the reflector image, (which can be obtained from P-wave reflection alone), combining SV and SH wave reflections determines the azimuth of the reflector. In the formation 38 surrounding the source wellbore 22, the radiation pattern (containing azimuthal variation) of the SV and SH waves due to a directional source are given by:

$$SV \approx \cos\theta \cos\phi \quad (3)$$

$$SH \approx \sin\phi \quad (4)$$

where $\theta$ is the angle from the wellbore axis. The above radiation patterns show that SH amplitude is generally greater than SV wave amplitude, especially when the wave incidence is close to normal incidence (when $\theta \approx 90°$, $\cos\theta \approx 0$). In this scenario, the reflector azimuth is found by minimizing the SV (or maximizing SH) wave amplitude. In other scenarios where $\theta$ is different from 90°, the reflector azimuth can be found from the four-component data using the method described in U.S. Provisional Patent Application 60/871,895.

In another embodiment of the invention, the reflector (the second wellbore) trajectory and azimuth can be found by using a single-component device and rotating it in the measurement well. The single-component device is a subset (or inline component) of the four-component system that records xx data only. The purpose of the rotation is to perform azimuthal scanning to locate the reflector azimuth. The principle of operation of the single-component system is now described. As shown by Tang and Patterson in U.S. Provisional Patent Application 60/871,895, the single-component data is a combination of both SV and SH waves reflected from the reflector, given by $$xx = SH \sin^2\phi + SV \cos^2\phi \quad (5)$$

Thus, when the directional device orients to the reflector ($\phi=0$), it measures a SV wave; when the device orients 90° from the reflector ($\phi=90°$), it measures a SH wave. According to equations (3) and (4), SH amplitude is generally greater than SV wave amplitude, especially when the wave incidence is close to normal incidence (when $\theta \approx 90°$, $\cos\theta \approx 0$). Therefore, the measured signal will show a minimum response at $\phi=0°$ and a maximum response at $\phi=90°$. Thus, by scanning the single-component device versus azimuth, the reflector azimuth can be found when the measured acoustic signal is minimal.

In yet another embodiment of the invention, the reflector (the second wellbore) trajectory and azimuth can be found by using a two-component device and rotating it in the measurement well. The two-component device is a subset of the four-component system that records the xx and xy data only. The xx component data is already given in equation (5). The xy component is given by (U.S. Provisional Patent Application 60/871,895), $$xy = (SV-SH)\sin\phi \cos\phi \quad (6)$$

The advantage of using the xy, or cross-line component data is that when the directional device orientation is toward ($\phi=0$) or perpendicular to the reflector ($\phi=90°$), the xy data will vanish. The additional information from the xy data will add robustness to the reflector azimuth determination.

Field Example

Figure 4:
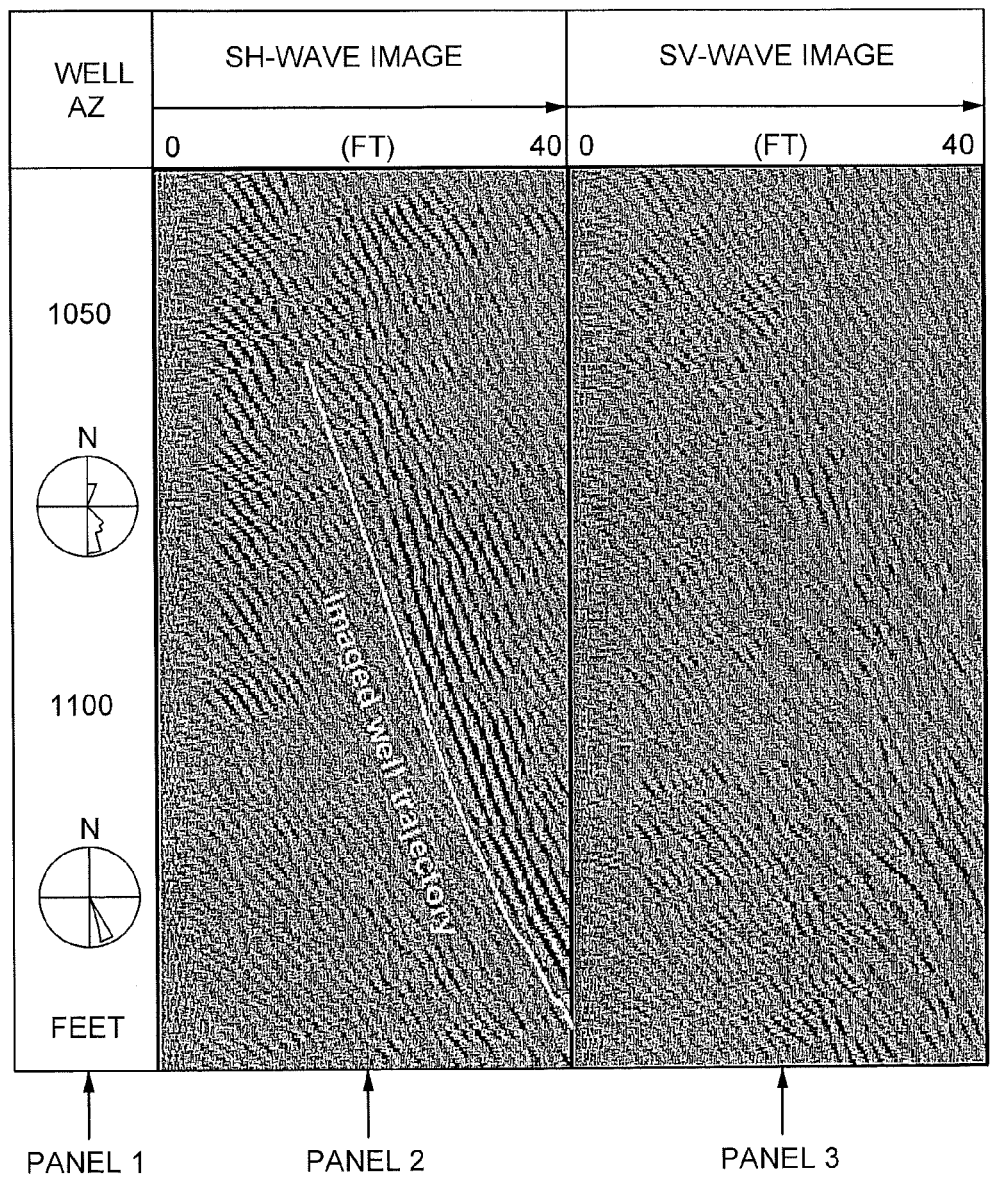
FIG. 4 is an example of delineating a wellbore trajectory using the system of FIG. 1.

Referring to FIG. 4, an example of delineating a wellbore trajectory using the above described method and system is illustrated. The field test location is Baker Hughes' Beta test site in Mounds, Okla. A four-component acoustic data (xx, xy, yy, yx) is acquired in a wellbore that has the detailed wellbore architecture of the nearby wellbore. The SH (panel 2) and SV (panel 3) wave imaging results across a depth interval where a (coplanar) nearby wellbore location is known. The SH-wave image delineates the trajectory of the wellbore, which becomes coplanar with the measurement wellbore around 1060 ft, at a distance of about 19 ft, and disappears around 1150 ft, at a distance of about 40 ft due to finite length of the wave data (14 ms only). The azimuth of the nearby wellbore (panel 1), as determined from the SH and SV waves is almost due south. The imaged reflector position and azimuth are in good agreement with the wellbore architecture information, validating the shear-wave imaging technique. Convincing evidence of the directional sensitivity of shear-wave imaging is also demonstrated, as the SV wave image (panel 3) shows almost no trace of the nearby wellbore. This is because, for the two wellbores that are approximately parallel, the incident angle θ of the waves relative to borehole axis is close to 90°, which, according to equations (3) and (4), yields almost zero amplitude for the SV wave. The field data example verifies the directional aspect of the SH and SV waves and the advantage of using the SH and SV waves for azimuth determination.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of delineating a second wellbore from a first wellbore, comprising:
    emitting first acoustic shear waves and second acoustic shear waves from a tool in the first wellbore the first acoustic shear waves being polarized in a plane containing the first wellbore and the second acoustic shear waves being polarized in a plane normal to the plane containing the first wellbore;
    receiving acoustic waves at the tool reflected from the second wellbore; and
    determining azimuthal orientation and distance of at least a portion of the second wellbore relative to the tool.

2. The method of delineating a second wellbore from a first wellbore of claim 1, wherein determining azimuth includes analysis of reflections of the first acoustic shear waves and the second acoustic shear waves.

3. The method of delineating a second wellbore from a first wellbore of claim 2, wherein the analysis of the reflections of the first acoustic shear waves and the second acoustic shear waves includes amplitude maximization of one of the reflections of the first acoustic shear waves and the second acoustic shear waves received.

4. The method of delineating a second wellbore from a first wellbore of claim 1, further comprising combining the method of claim 1 with a wellbore drilling operation.

5. The method of delineating a second wellbore from a first wellbore of claim 4, further comprising predicting a drilling trajectory of the second wellbore.

6. The method of delineating a second wellbore from a first wellbore of claim 4, further comprising steering the drilling operation in response to feedback provided by the determining.

7. The method of delineating a second wellbore from a first wellbore of claim 1, further comprising mapping a trajectory of the second wellbore.

8. The method of delineating a second wellbore from a first wellbore of claim 1, wherein the determining further comprises scanning only a particular orientation range.

9. A downhole wellbore delineation system, comprising:
    at least one acoustic emitter positionable within a first wellbore being configured to emit first acoustic shear waves in a plane containing the first wellbore and second acoustic shear waves normal to the plane containing the first wellbore into the earth;
    at least one acoustic receiver receptive of acoustic waves reflected from a second wellbore; and
    a processor in operable communication with the at least one acoustic emitter and the at least one acoustic receiver, the system able to determine at least a distance and azimuthal orientation of at least a portion of the second wellbore relative to the delineation system.

10. The downhole wellbore delineation system of claim 9, wherein the first acoustic shear wave is polarized orthogonally to the second acoustic shear wave.

11. A method of steering a wellbore drilling operation, comprising:
    emitting first acoustic shear waves from an existing first wellbore polarized in a plane containing the first wellbore;
    emitting second acoustic shear waves from the existing first wellbore polarized in a plane normal to the plane containing the first wellbore;
    receiving reflected acoustic waves from a second wellbore being drilled;
    determining an azimuthal orientation of the second wellbore from the existing first wellbore;
    determining a distance of the second wellbore from the existing first wellbore; and
    steering the wellbore drilling operation based upon the determined azimuthal orientation and distance.

12. The method of steering a wellbore drilling operation of claim 11, further comprising predicting a trajectory of the wellbore being drilled by the wellbore drilling operation.

13. The method of steering a wellbore drilling operation of claim 11, wherein the determining an orientation includes scanning a specific azimuth range for the reflected acoustic waves.

* * * * *